United States Patent
Yamaguchi et al.

[11] Patent Number: 5,297,128
[45] Date of Patent: Mar. 22, 1994

[54] OPTICAL INFORMATION RECORDING/REPRODUCING APPARATUS INCLUDING MEANS FOR VARYING INTENSITY OF A PREHEATING LIGHT BEAM

[75] Inventors: Eiji Yamaguchi, Sagamihara; Susumu Matsumura, Kawaguchi; Hiroaki Hoshi, Yokohama; Masakuni Yamamoto, Yamato; Hideki Morishima, Atsugi, all of Japan

[73] Assignee: Canon Kabushiki Kaisha, Tokyo, Japan

[21] Appl. No.: 984,740

[22] Filed: Dec. 2, 1992

Related U.S. Application Data

[63] Continuation of Ser. No. 797,179, Nov. 25, 1991, abandoned.

Foreign Application Priority Data

Nov. 27, 1990 [JP] Japan ............... 2-321119

[51] Int. Cl.$^5$ ............................................. G11B 7/125
[52] U.S. Cl. ..................................... 369/116; 369/120; 369/106
[58] Field of Search ............... 369/116, 100, 106, 107, 369/120, 126; 365/122

[56] References Cited

U.S. PATENT DOCUMENTS

| | | | |
|---|---|---|---|
| 3,631,415 | 12/1971 | Aagard et al. | 365/122 |
| 4,530,080 | 7/1985 | Aoi et al. | 369/44.13 |
| 4,841,514 | 6/1989 | Tsuboi et al. | 369/100 |
| 4,853,912 | 8/1989 | Akasaka et al. | 369/73 |

OTHER PUBLICATIONS

Patent Abstracts of Japan, vol. 8, No. 6, an English Abstract published Jan. 12, 1984 of Japanese Patent No. 58 169 303.
Patent Abstracts of Japan, vol. 8, No. 257, an English Abstract published Nov. 24, 1984 of Japanese Patent No. 59 127 242.
Patent Abstracts of Japan, vol. 11, No. 45, an English Abstract published Feb. 10, 1987 of Japanese Patent No. 61-214,266 published published Sep. 24, 1986.

*Primary Examiner*—Paul M. Dzierzynski
*Assistant Examiner*—James Beyer
*Attorney, Agent, or Firm*—Fitzpatrick, Cella, Harper & Scinto

[57] ABSTRACT

An optical information recording/reproducing apparatus provided with a device for irradiating an information track of an optical information recording medium with a preheating light beam. Simultaneously, a recording/reproducing light beam irradiates a light spot of the preheating light beam on the recording medium. The light intensity of the preheating light beam is varied in accordance with the environmental temperature of the apparatus detected by a detector. By such a construction, the recording/reproducing condition of information is kept constant, irrespective of the environmental temperature.

28 Claims, 6 Drawing Sheets

FIG. 1A  LOW TEMPERATURE

FIG. 1B  ORDINARY TEMPERATURE

FIG. 1C  HIGH TEMPERATURE

OPTICAL INFORMATION RECORDING/REPRODUCING APPARATUS INCLUDING MEANS FOR VARYING INTENSITY OF A PREHEATING LIGHT BEAM

This application is a continuation of application Ser. No. 07/797,179 filed Nov. 25, 1991, now abandoned.

BACKGROUND OF THE INVENTION

1. Field of the Invention

The present invention relates to an information recording and/or reproducing apparatus for recording information on an optical information recording medium and/or reproducing the information, and more particularly to an optical information recording and/or reproducing apparatus which is suitable for bit edge recording (which is also called pit edge recording).

2. Related Background Art

As information is utilized more extensively, a large capacity information recording and/or reproducing apparatus is required. An optical information recording and/or reproducing apparatus which optically records and/or reproduces information has been attracting notice as one which meets the above requirement. An information recording mode in such an optical information recording and/or reproducing apparatus includes bit position recording (mark interval recording) in which the significance of the information is in the position of the center of the record bit, and bit edge recording (mark length recording) in which the significance of the information is in the position of the bit edge. The bit position recording has a characteristic of exactly recording the information while the bit edge recording has the advantage that its recording density is 1.5 times higher than bit position recording. Accordingly, bit edge recording is advantageous for achieving high density recording and bit edge recording has been actively studied recently.

Figure 1A:
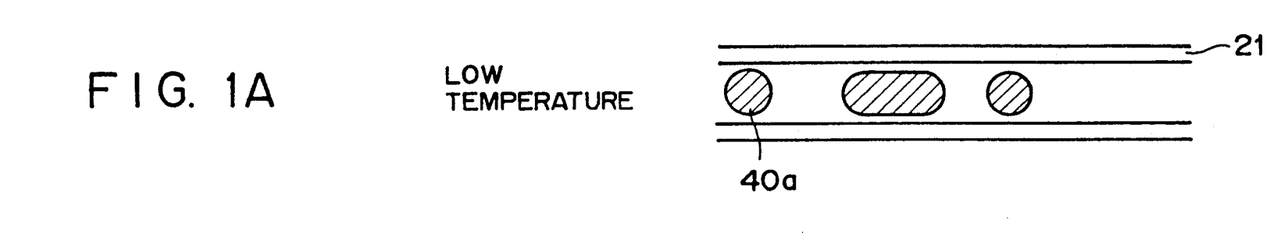
FIGS. 1A to 1C illustrate a record bit at different environmental temperatures.
Figure 1B:
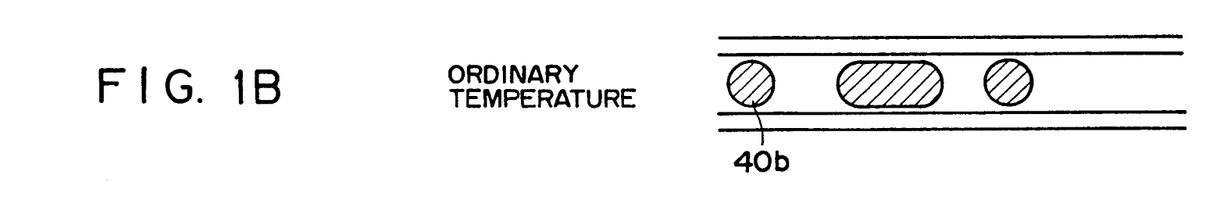
Figure 1C:
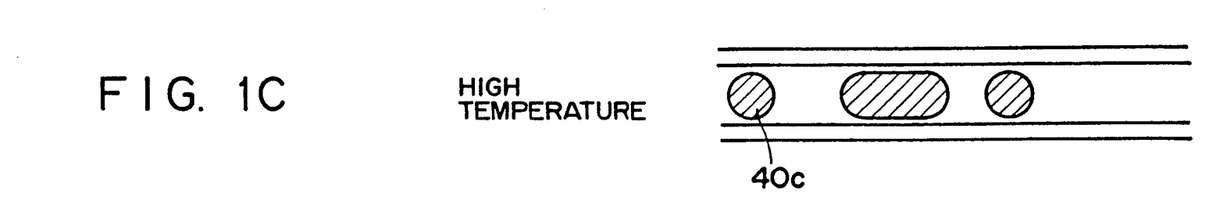

However, bit edge recording has the following problem. In a so-called heat mode recording in which photoenergy is converted to thermal energy, which is used to record information, edge positions at the beginning and the end of the record bit are determined by a critical temperature at the time of the recording. Accordingly, the edge position of the record bit is easily affected by the surrounding temperature of the apparatus and the internal temperature. FIGS. 1A to 1C show changes in the record bit relative to the variation of temperature. FIG. 1A shows a record bit 40a during low temperature recording, FIG. 1B shows a record bit 40b during ordinary temperature recording, and FIG. 1C shows a record bit 40c during high temperature recording. Recording conditions other than the temperature are identical. The higher the temperature, the larger the area of the record bit and the more the edge position of the record bit changes.

SUMMARY OF THE INVENTION

It is an object of the present invention to provide an optical information recording and/or reproducing apparatus which can exactly record information irrespective of any temperature change.

The above object of the present invention is achieved by an optical information recording and/or reproducing apparatus for recording information by irradiating an information track of an optical information recording medium with a preheating light beam and simultaneously irradiating a light spot of the light beam with a recording beam, comprising detection means for detecting the environmental temperature of the apparatus and means for varying the light intensity of the preheating light beam in accordance with the detection result of the detection means.

DETAILED DESCRIPTION OF THE PREFERRED EMBODIMENTS

Figure 2:
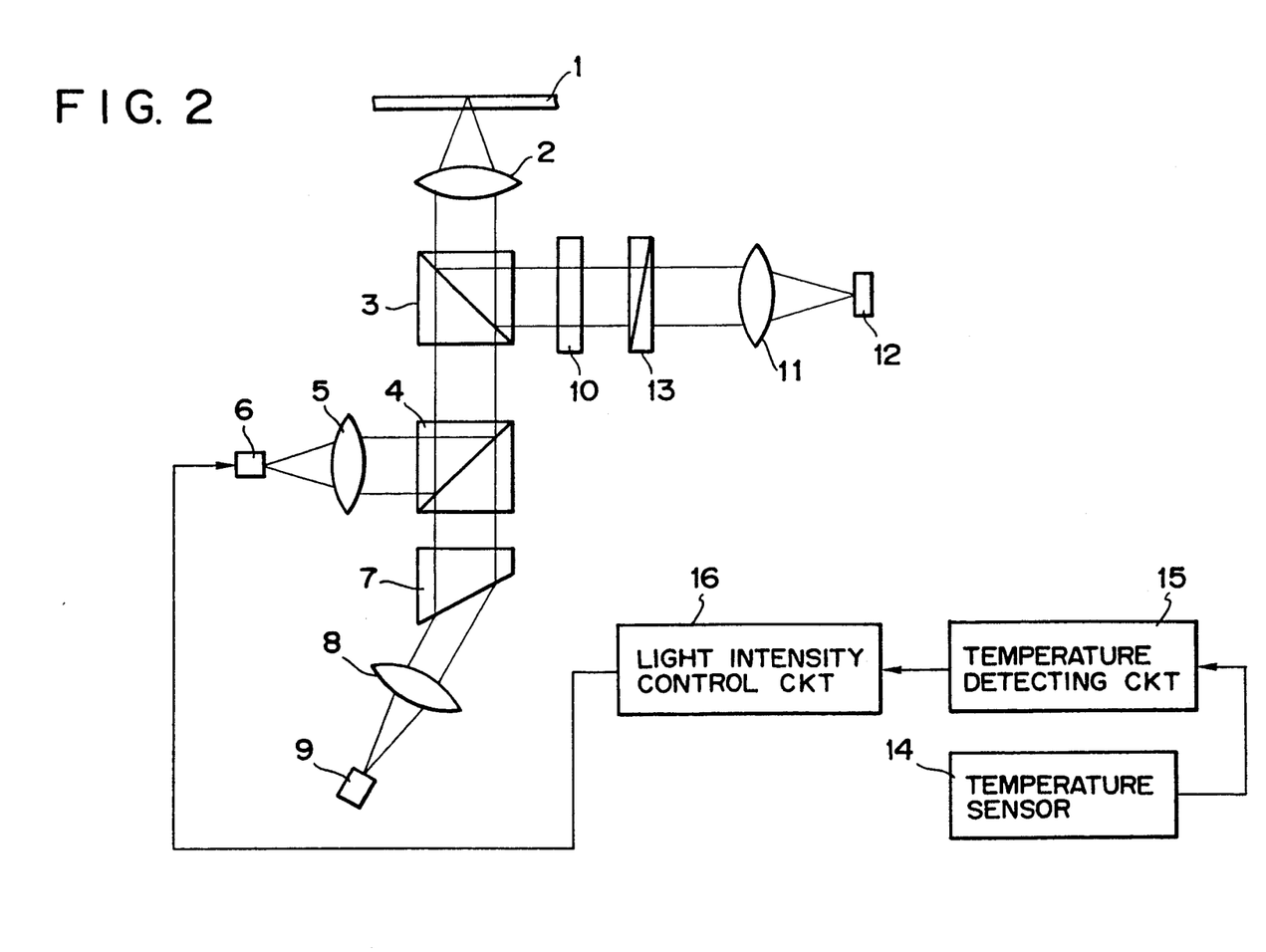
FIG. 2 shows a configuration of one embodiment of the optical information recording and/or reproducing apparatus of the present invention.

An embodiment of the present invention is explained in detail with reference to the drawings. FIG. 2 shows a configuration of an optical head optical system in the optical information recording and/or reproducing apparatus of the present invention.

In FIG. 2, numeral 1 denotes an optical disk which is an optical information recording medium, and numeral 2 denotes an objective lens for condensing a light beam of a light source. In the present embodiment, the light source includes a semiconductor laser 6 for irradiating a preheating light beam and a semiconductor laser 9 for irradiating a recording light beam.

Figure 3:
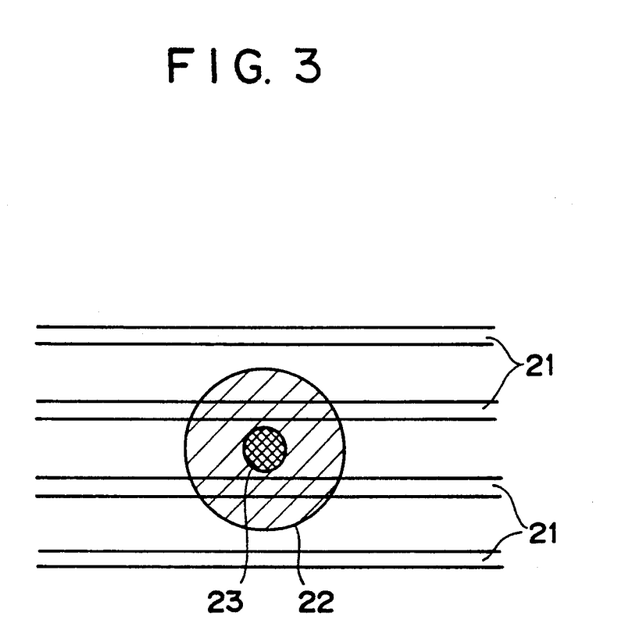
FIG. 3 shows the status of a spot of a preheating light beam and a spot of a recording light beam which irradiate a medium surface.

The light beam of the preheating semiconductor laser 6 is collimated by a collimator lens 5, reflected by a beam splitter 4, passes through a beam splitter 3 and is directed to the objective lens 2. The incident light beam is condensed by the objective lens 2 and irradiates a recording layer of the optical disk 1 as a light spot 22 as shown in FIG. 3.

On the other hand, the light beam of the recording semiconductor laser 9 which has a different wavelength from that of the preheating semiconductor laser 6 is collimated by a collimator lens 8 and converted to a circular beam by a beam shaping prism 7. The converted light beam passes through the beam splitters 4 and 3 and is directed to the objective lens 2. The incident light beam is condensed by the objective lens 2 and irradiates the recording layer of the optical disk 1 as a light spot 23 as shown in FIG. 3. In this case, the recording light spot 23 irradiates the recording layer such that it is located on an information track between tracking tracks 21. The preheating light spot 22 is sufficiently larger in size than the light spot 23 so that it irradiates the light spot 23 and its peripheral region. The light intensity of the recording light beam is modulated by a modulator (not shown) in accordance with a record signal. The recording layer is preheated by the preheating light beam to a temperature which does not cause the recording of information, and the intensity-modulated recording light beam irradiates the recording layer to record the information.

When the recorded information is to be reproduced, the light intensity of the recording semiconductor laser 9 is lowered to a reproducing power, and the reproducing light beam irradiates to the optical disk 1 like the recording mode. The irradiated light beam is reflected by the optical disk 1, passes through the objective lens 2 and is directed to the beam splitter 3. The beam splitter 3 reflects the incident light beam to the reproducing light beam detection optical system. In the detection optical system, only the light beam of the semiconductor laser 9 is transmitted through a wavelength filter 10 and the light beam of the semiconductor laser 6 is blocked. The reproducing light beam transmitted through the wavelength filter 10 passes through an analyzer 13 and a focusing lens 11 and is detected by a photo-detector 12. The analyzer 13 is arranged because a polarized light is utilized when the optical disk 1 is a magneto-optical recording medium.

A temperature sensor 14 shown in FIG. 2 senses the internal or external temperature of the apparatus, that is, the environmental temperature. A temperature detector 15 supplies a control signal which varies with the sensed output of the temperature sensor 14, to a light intensity control circuit 16, which controls the light intensity of the preheating semiconductor laser 6 in accordance with the control signal. The laser 6 is controlled such that when the environmental temperature sensed by the temperature sensor 14 rises, the light intensity is lowered, and when the environmental temperature drops, the light intensity is increased. In this manner, the temperature of the recording layer in the irradiation area of the preheating light spot 22 is maintained constant without regard to the environmental temperature.

Figure 4:
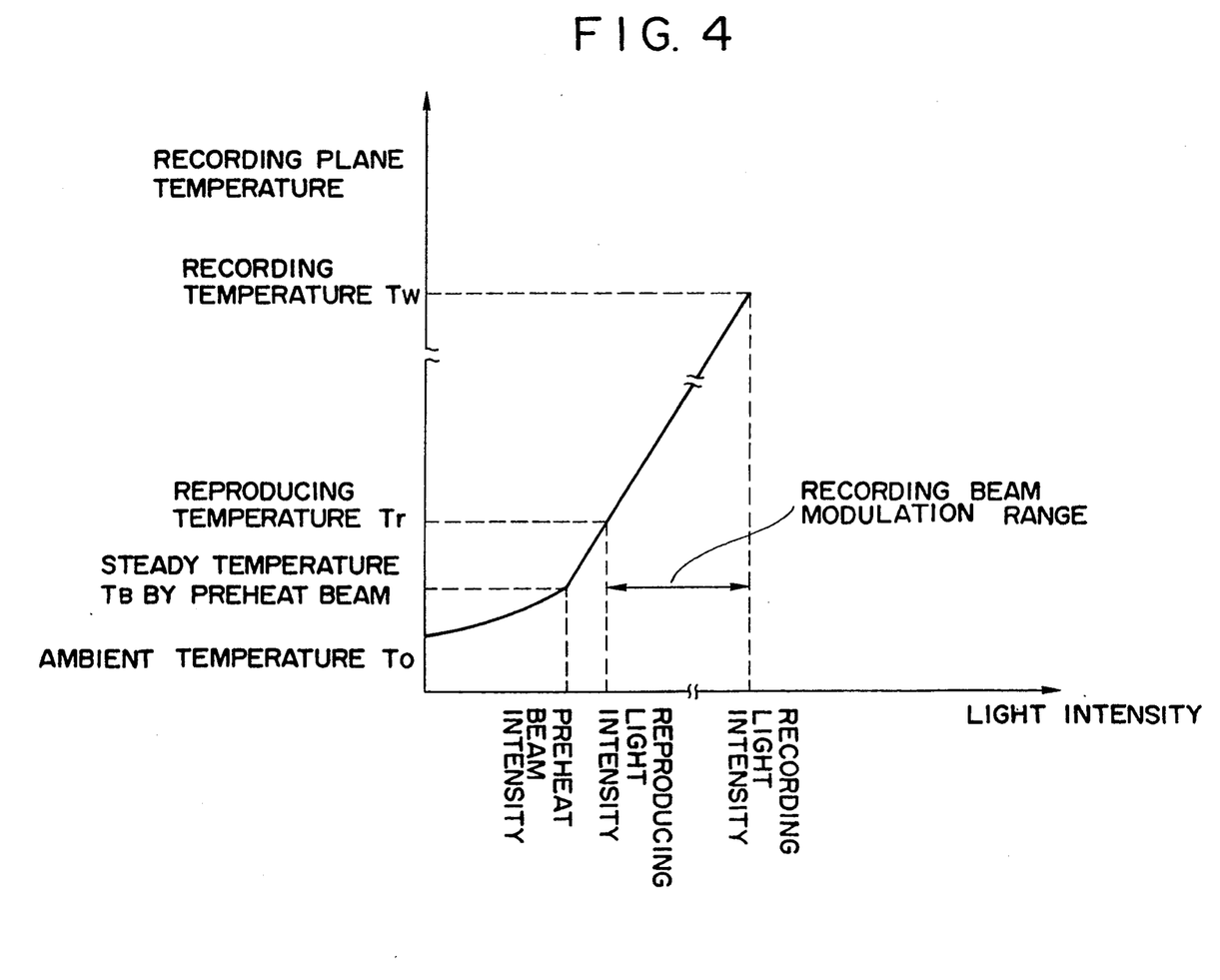
FIG. 4 shows the relation between the light intensity on the medium surface and a temperature.

FIG. 4 shows the relation between the light intensity of the light beam and the temperature of the recording layer of the optical disk. In FIG. 4, $T_B$ denotes a steady temperature caused by the preheating light beam and $T_o$ denotes the environmental temperature. As described above, the steady temperature $T_B$ is always constant irrespective of the environmental temperature $T_o$. The steady temperature $T_B$ is set to a temperature which does not cause the recording of the information. Tw denotes the recording temperature and Tr denotes the reproducing temperature. The light intensity of the recording semiconductor laser 9 is modulated within the temperature range.

In the present embodiment, even if the environmental temperature varies, the recording spot irradiation area on the optical disk 1 can be maintained at the predetermined reproducing temperature Tr or recording temperature Tw. Accordingly, the recording condition of the information is kept constant irrespective of the temperature. Thus, the problem of variation of the edge position of the record bit which was encountered in the prior art apparatus is solved and the information can be exactly recorded.

Figure 5:
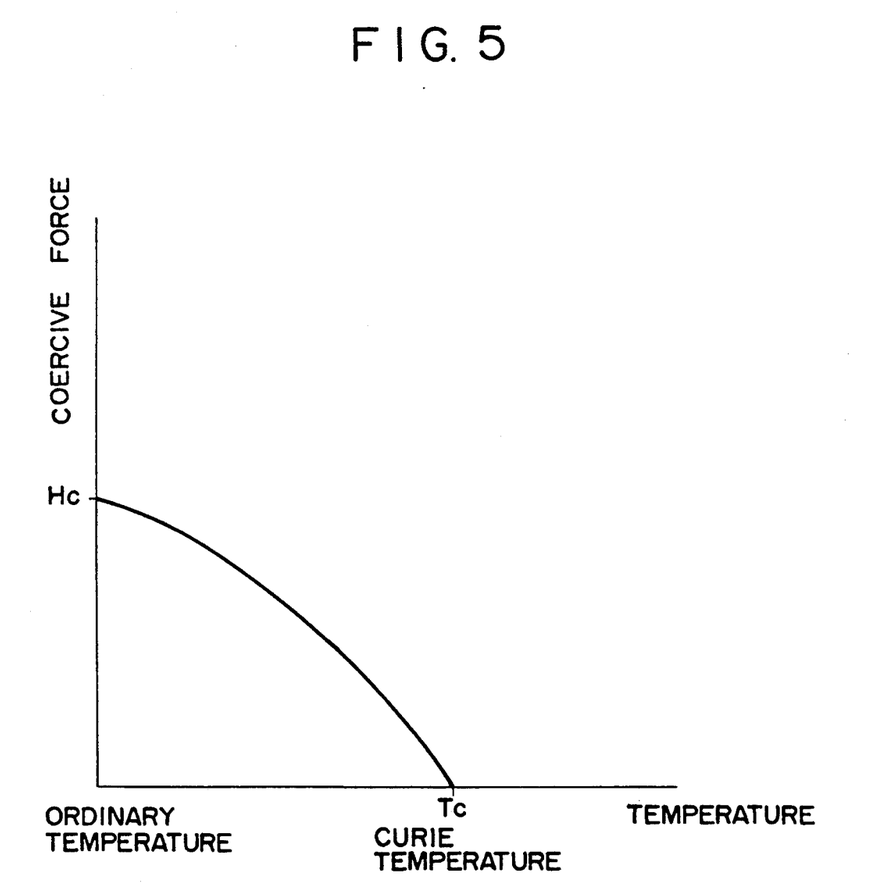
FIG. 5 shows the relation between the temperature of a magneto-optical recording medium and a coercive force.

An embodiment which uses a magneto-optical recording medium as the optical information recording medium is now explained. FIG. 5 shows the relation between a coercive force of the magneto-optical recording medium and a temperature. The coercive force Hc at room temperature gradually decreases as the temperature rises and reaches zero at Curie point Tc. A material having such a characteristic is an amorphous film of TbFeCo. It is also known that a Kerr effect decreases as the temperature rises, as the coercive force does. Accordingly, the temperature of the medium may be indirectly detected from the amplitude of a signal reproduced by using the Kerr effect.

Figure 6:
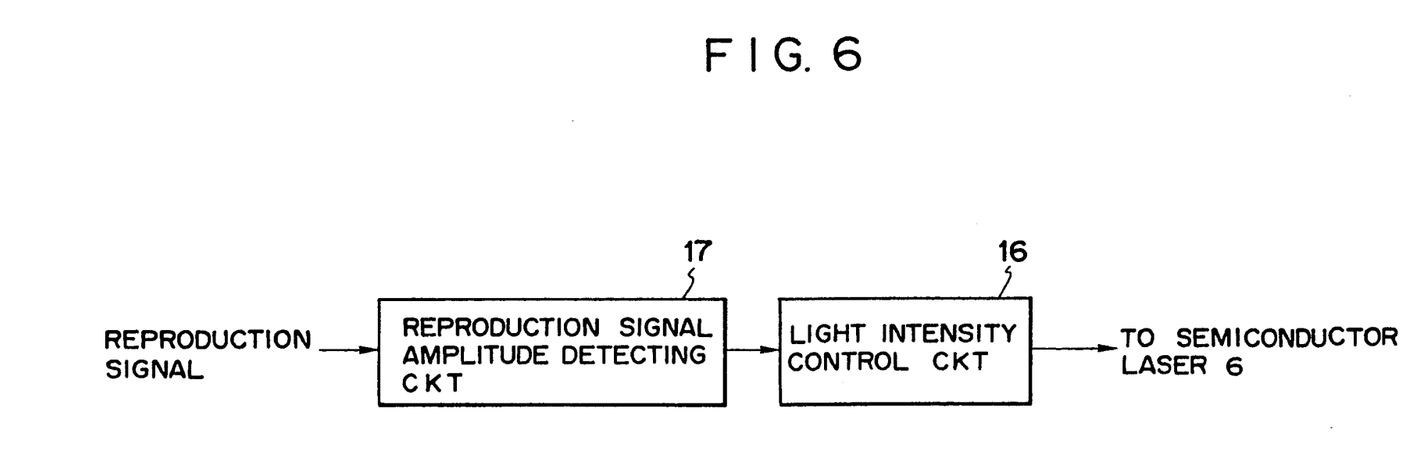
FIG. 6 shows a block diagram of another embodiment.

FIG. 6 shows the embodiment based on the above finding. Numeral 17 denotes a reproduced signal amplitude detector for detecting the amplitude of the reproduced signal of the photo-detector 12. Numeral 16 denotes a light intensity control circuit which is identical to that shown in FIG. 2 and which controls the light intensity of the preheating semiconductor laser 6 in accordance with the reproduced signal amplitude. In the present embodiment, the medium temperature can be kept constant as it is in the previous embodiment. The present invention is not limited to the above embodiments. For example, data recorded in a predetermined temperature environment may be recorded in a monitor area of the medium as a medium temperature reference and the light intensity of the preheating light beam may be corrected prior to the recording.

In accordance with the present invention, the light intensity of the preheating light beam is varied in accordance with the environmental temperature so that the medium temperature can be maintained at the predetermined temperature even if the environmental temperature changes. Accordingly, the information can always be recorded under the constant temperature condition and the change of the size or length of the record bit due to a temperature change is reduced and the information can be exactly recorded. The effect is particularly great in the bit edge recording in which the significance of the information is in the edge position of the record bit.

What is claimed is:

1. An optical information recording apparatus comprising:
    means for irradiating an information track of an optical information recording medium with a preheating light beam;
    means for irradiating a light spot of the preheating light beam with a recording light beam;
    detection means for detecting the environmental temperature of the apparatus; and
    means for varying the light intensity of the preheating light beam in accordance with the detection result of said detection means.

2. An optical information recording apparatus according to claim 1, wherein said optical information recording medium is a magneto-optical recording medium.

3. An information recording and/or reproducing apparatus comprising:
    means for irradiating an information track of a magneto-optical recording medium with a preheating light beam;
    means for irradiating a light spot of the preheating light beam with a recording light beam;
    means for detecting the amplitude of a signal reproduced from the magneto-optical recording medium; and
    means for varying the light intensity of the preheating light beam in accordance with the detection result of said detecting means.

4. An apparatus according to claim 1, wherein the preheating light beam and the recording light beam have different wavelengths from each other.

5. An apparatus according to claim 1, wherein the size of the light spot of the preheating light beam is larger than the light spot of the recording light beam.

6. An optical information recording apparatus comprising:

means for irradiating an information track of an optical information recording medium with a preheating light beam;
means for irradiating the information track of the optical information recording medium with a recording light beam;
detection means for detecting the environmental temperature of the apparatus; and
means for varying the light intensity of the preheating light beam in accordance with the detection result of said detection means.

7. An apparatus according to claim 6, wherein the optical information recording medium is a magnetooptical information recording medium.

8. An apparatus according to claim 6, wherein the preheating light beam and the recording light beam have different wavelengths from each other.

9. An apparatus according to claim 6, wherein the size of a light spot of the preheating light beam is larger than a light spot of the recording light beam.

10. An optical information recording/reproducing apparatus comprising:
means for irradiating an information track of a magnetooptical information recording medium with a preheating light beam;
means for irradiating the information track of the magnetooptical information recording medium with a recording light beam;
detection means for detecting the amplitude of a reproduction signal read out from the magnetooptical information recording medium; and
means for varying the light intensity of the preheating light beam in accordance with the detection result of said detection means.

11. A method of recording information in an optical information recording apparatus, said method comprising the steps of:
irradiating an information track of an optical information recording medium with a preheating light beam;
irradiating a light spot of the preheating light beam with a recording light beam; and
detecting the environmental temperature of the apparatus and varying the light intensity of the preheating light beam in accordance with the detection result.

12. A method according to claim 11, wherein the optical information recording medium is a magnetooptical information recording medium.

13. A method according to claim 11, wherein the preheating light beam and the recording light beam have different wavelengths from each other.

14. A method according to claim 11, wherein the size of the light spot of the preheating light beam is larger than the light spot of the recording light beam.

15. A method of recording information in an optical information recording/reproducing apparatus, said method comprising the steps of:
irradiating an information track of a magnetooptical information recording medium with a preheating light beam;
irradiating a light spot of the preheating light beam with a recording light beam; and
detecting the amplitude of a reproduction signal read out from the magnetooptical information recording medium and varying the light intensity of the preheating light beam in accordance with the detection result.

16. A method of recording information in an optical information recording apparatus, said method comprising the steps of:
irradiating an information track of an optical information recording medium with a preheating light beam;
irradiating the information track of the optical information recording medium with a recording light beam; and
detecting the environmental temperature of the apparatus and varying the light intensity of the preheating light beam in accordance with the detection result.

17. A method according to claim 16, wherein the optical information recording medium is a magnetooptical information recording medium.

18. A method according to claim 16, wherein the preheating light beam and the recording light beam have different wavelengths from each other.

19. A method according to claim 16, wherein the size of a light spot of the preheating light beam is larger than a light spot of the recording light beam.

20. A method of recording information in an optical information recording/reproducing apparatus, comprising the steps of:
irradiating an information track of a magnetooptical recording medium with a preheating light beam;
irradiating the information track of the magnetooptical recording medium with a recording light beam; and
detecting the amplitude of a reproduction signal read out from the magnetooptical recording medium and varying the light intensity of the preheating light beam in accordance with the detection result.

21. An optical information recording/reproducing apparatus comprising:
means for irradiating an information track of a magnetooptical recording medium with a preheating light
means for irradiating a light spot of the preheating light beam with a recording light beam; and
means for detecting a reproduction signal read out from the magnetooptical recording medium and for varying the light intensity of the preheating light beam in accordance with the detection result.

22. An optical information recording/reproducing apparatus comprising:
means for irradiating an information track of a magnetooptical recording medium with a preheating light beam;
means for irradiating the information track of the magnetooptical recording medium with a recording light beam;
means for detecting a reproduction signal read out from the magnetooptical recording medium; and
means for varying the light intensity of the preheating light beam in accordance with the detection result of said detection means.

23. A method of recording information in an optical information recording/reproducing apparatus, said method comprising the steps of:
irradiating an information track of a magnetooptical recording medium with a preheating light beam;
irradiating a light spot of the preheating light beam with a recording light beam; and
detecting a reproduction signal read out from the magnetooptical recording medium and varying the light intensity of the preheating light beam in accordance with the detection result.

24. A method of recording information in an optical information recording/reproducing apparatus, comprising the steps of:
irradiating an information track of a magnetooptical recording medium with a preheating light beam;
irradiating the information track of the magnetooptical recording medium with a recording light beam; and
detecting a reproduction signal read out from the magnetooptical recording medium and varying the light intensity of the preheating light beam in accordance with the detection result.

25. An optical information recording/reproducing apparatus comprising:
means for irradiating an information track of a magnetooptical recording medium with a preheating light beam;
means for irradiating a light spot of the preheating light beam with a recording light beam;
detection means for optically detecting the temperature of the magnetooptical recording medium; and
means for varying the light intensity of the preheating light beam in accordance with the detection result of said detection means.

26. An optical information recording/reproducing apparatus comprising:
means for irradiating an information track of a magnetooptical recording medium with a preheating light beam;
means for irradiating the information track of the magnetooptical recording medium with a recording light beam;
detection means for optically detecting the temperature of the magnetooptical recording medium; and
means for varying the light intensity of the preheating light beam in accordance with the detection result of said detection means.

27. A method of recording information in an optical information recording/reproducing apparatus, comprising the steps of:
irradiating an information track of a magnetooptical recording medium with a preheating light beam;
irradiating a light spot of the preheating light beam with a recording light beam; and
optically detecting the temperature of the magnetooptical recording medium and varying the light intensity of the preheating light beam in accordance with the detection result.

28. A method of recording information in an optical information recording/reproducing apparatus, comprising the steps of:
irradiating an information track of a magnetooptical recording medium with a preheating light beam;
irradiating the information track of the magnetooptical recording medium with a recording light beam; and
optically detecting the temperature of the magnetooptical recording medium and varying the light intensity of the preheating light beam in accordance with the detection result.

* * * * *

UNITED STATES PATENT AND TRADEMARK OFFICE
CERTIFICATE OF CORRECTION

PATENT NO. : 5,297,128
DATED : March 22, 1994
INVENTOR(S) : YAMAGUCHI ET AL.

It is certified that error appears in the above-indentified patent and that said Letters Patent is hereby corrected as shown below:

Column 6, line 40, change "light" to —light beam;—.

Signed and Sealed this

Twentieth Day of December, 1994

Attest:

BRUCE LEHMAN

Attesting Officer     Commissioner of Patents and Trademarks